(12) United States Patent
Asaoka et al.

(10) Patent No.: US 11,554,525 B2
(45) Date of Patent: Jan. 17, 2023

(54) INJECTION MOLDING MACHINE (71) Applicant: FANUC CORPORATION, Minamitsuru-gun (JP)

(72) Inventors: Hiroyasu Asaoka, Yamanashi-ken (JP); Atsushi Horiuchi, Yamanashi-ken (JP); Kenjirou Shimizu, Yamanashi-ken (JP); Haruhiko Nakao, Yamanashi-ken (JP)

(73) Assignee: FANUC CORPORATION

( * ) Notice: Subject to any disclaimer, the term of this patent is extended or adjusted under 35 U.S.C. 154(b) by 118 days.

(21) Appl. No.: 16/913,388

(22) Filed: Jun. 26, 2020

(65) Prior Publication Data
US 2021/0001527 A1  Jan. 7, 2021

(30) Foreign Application Priority Data

Jul. 4, 2019 (JP) .............................. JP2019-125146

(51) Int. Cl.
| | | |
|---|---|---|
| *B29C 45/76* | (2006.01) | |
| *B29C 45/77* | (2006.01) | |
| *B29C 45/78* | (2006.01) | |
| *B29C 45/80* | (2006.01) | |
| *B29C 45/60* | (2006.01) | |
| *B29C 45/62* | (2006.01) | |

(Continued)

(52) U.S. Cl.
CPC ............ *B29C 45/77* (2013.01); *B29C 45/461* (2013.01); *B29C 45/5008* (2013.01); *B29C 45/60* (2013.01); *B29C 45/62* (2013.01); *B29C 45/78* (2013.01); *B29C 45/80* (2013.01); *B29C 2045/504* (2013.01)

(58) Field of Classification Search
CPC ..... B29C 45/00; B29C 45/0005; B29C 45/18; B29C 45/46; B29C 45/50; B29C 45/60; B29C 45/77; B29C 45/78; B29C 45/80
See application file for complete search history.

(56) References Cited

U.S. PATENT DOCUMENTS

| | | | |
|---|---|---|---|
| 2007/0196530 A1* | 8/2007 | Shiraishi ................. | B29C 45/50 |
| | | | 425/149 |
| 2016/0009010 A1* | 1/2016 | Kariya .................... | B29C 45/50 |
| | | | 264/328.18 |

FOREIGN PATENT DOCUMENTS

| | | | |
|---|---|---|---|
| JP | 2003-305758 A | 10/2003 | |
| JP | 2010-005840 A | 1/2010 | |

* cited by examiner

*Primary Examiner* — Joseph S Del Sole
*Assistant Examiner* — Thu-Khanh T. Nguyen
(74) *Attorney, Agent, or Firm* — McGinn I.P. Law Group, PLLC.

(57) ABSTRACT

An injection molding machine includes: a first driving device rotating a screw provided inside a heating cylinder; a second driving device moving the screw forward and backward; a metering control section configured to, by controlling the first driving device and the second driving device, to meter resin while melting the resin, and thereafter rotate the screw in reverse to thereby reduce the pressure of the resin; a first sensor unit for detecting the pressure; a second sensor unit for detecting one or more kinds of physical quantities that affect the change of the pressure; and a prediction section predicting decompressing rotation information based on the pressure detected by the first sensor unit and the one or more kinds of physical quantities detected by the second sensor unit. The metering control section controls the first driving device based on the decompressing rotation information predicted by the prediction section.

19 Claims, 5 Drawing Sheets

(51) Int. Cl.
*B29C 45/50* (2006.01)
*B29C 45/46* (2006.01)

INJECTION MOLDING MACHINE

CROSS-REFERENCE TO RELATED APPLICATION

This application is based upon and claims the benefit of priority from Japanese Patent Application No. 2019-125146 filed on Jul. 4, 2019, the contents of which are incorporated herein by reference.

BACKGROUND OF THE INVENTION

Field of the Invention

The present invention relates to an injection molding machine that optimally performs depressurization of molten resin.

Description of the Related Art

Japanese Laid-Open Patent Publication No. 2010-005840 discloses an injection molding machine including a heating cylinder and a screw capable of rotating and moving back and forth inside the heating cylinder. In a general injection molding machine, as disclosed in Japanese Laid-Open Patent Publication No. 2010-005840, the screw is retracted while being rotated in the forward direction to thereby plasticize molten resin in the heating cylinder. Further, after plasticizing the molten resin, a general injection molding machine reduces the pressure applied to the molten resin by rotating the screw in reverse or retracting the screw. In Japanese Laid-Open Patent Publication No. 2010-005840, settings such as the rotation speed when the screw rotates, are specified previously by the operator.

SUMMARY OF THE INVENTION

Regarding the operation of rotating the screw in reverse when decompressing the molten resin, the rotation speed and/or rotation angle are generally specified by the operator (worker). However, there is a demand on the operator to consider the complicated conditions including the material characteristics of the molten resin and the performance of the injection molding machine in order to determine such settings. Therefore, in conventional general injection molding machines, settings of operation in decompressing the molten resin greatly depend on the skills of the operator, and hence it has been difficult for some operators to implement optimal decompression of the molten resin.

As a method for optimally decompressing the molten resin, it is conceivable to control the reverse rotation of the screw by feedback control based on the pressure sequentially detected during decompression. However, the magnitude of the pressure of the molten resin during depressurization is usually changing every moment because the rotation torque of the screw is continuously applied to the molten resin. Therefore, in feedback control, a time gap (control delay) inevitably occurs between the control command and the optimum control that should be performed on the molten resin at the time of outputting the control command. That is, in the general injection molding machine, it is difficult to realize the optimum decompression of the molten resin, even by use of feedback control.

Therefore, an object of the present invention is to provide an injection molding machine that optimally reduces the pressure of molten resin.

One aspect of the invention resides in an injection molding machine including a heating cylinder configured to melt resin and a screw provided inside the heating cylinder, including: a first driving device configured to rotate the screw inside the heating cylinder; a second driving device configured to move the screw forward and backward inside the heating cylinder; a metering control section configured to, by controlling the first driving device and the second driving device, move the screw backward while rotating the screw forward so as to meter the resin while melting the resin, and thereafter rotate the screw in reverse to thereby reduce the pressure of the resin; a first sensor unit configured to detect the pressure; a second sensor unit configured to detect one or more kinds of physical quantities that affect the change of the pressure, from the injection molding machine; and a prediction section configured to predict decompressing rotation information including at least one of the rotation angle by which the screw should be rotated in reverse after the metering in order to reduce the pressure to a target pressure and the rotation speed at which the screw should be rotated in reverse after the metering in order to keep the amount of change of the pressure per unit time at a predetermined level or lower, based on the pressure detected by the first sensor unit and the one or more kinds of physical quantities detected by the second sensor unit, wherein the metering control section is configured to control the first driving device based on the decompressing rotation information predicted by the prediction section.

According to the present invention, it is possible to provide an injection molding machine that optimally implements decompression of molten resin.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Preferred embodiments of the present invention will be detailed below with reference to the accompanying drawings. The directions described below should follow the arrows shown in the drawings.

Embodiment

Figure 1:
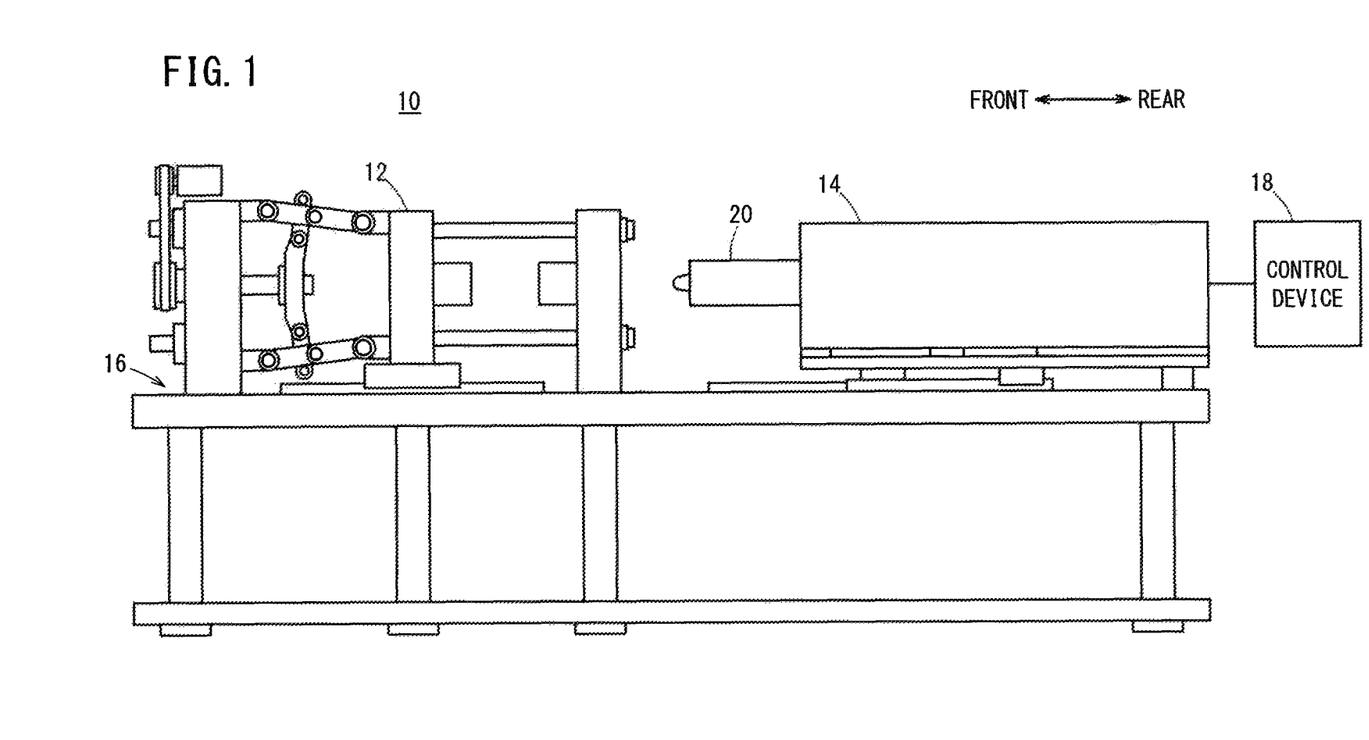
FIG. 1 is a side view of an injection molding machine according to an embodiment.

FIG. 1 is a side view showing an injection molding machine 10 according to an embodiment.

The injection molding machine 10 of this embodiment is also called an in-line type injection molding machine. The injection molding machine 10 includes a clamping unit 12 having a mold, an injection unit 14 that injects a molten resin (resin) into the mold of the clamping unit 12, and a machine base 16 that supports the clamping unit 12 and the injection unit 14, and a control device 18. Of these, the clamping unit 12 and the machine base 16 can be configured based on known technologies. Therefore, detailed description of the clamping unit 12 and the machine base 16 will be omitted in the present embodiment.

The control device 18 is a device that is connected to the injection unit 14 to control the injection unit 14. The control device 18 includes an operation interface (not shown). The operation interface includes, for example, an operation panel having operation keys, a keyboard, and a touch panel. The operator can specify and input, for example, the type of resin used for molding, the number of moldings and the like, through the operation interface.

Figure 2:
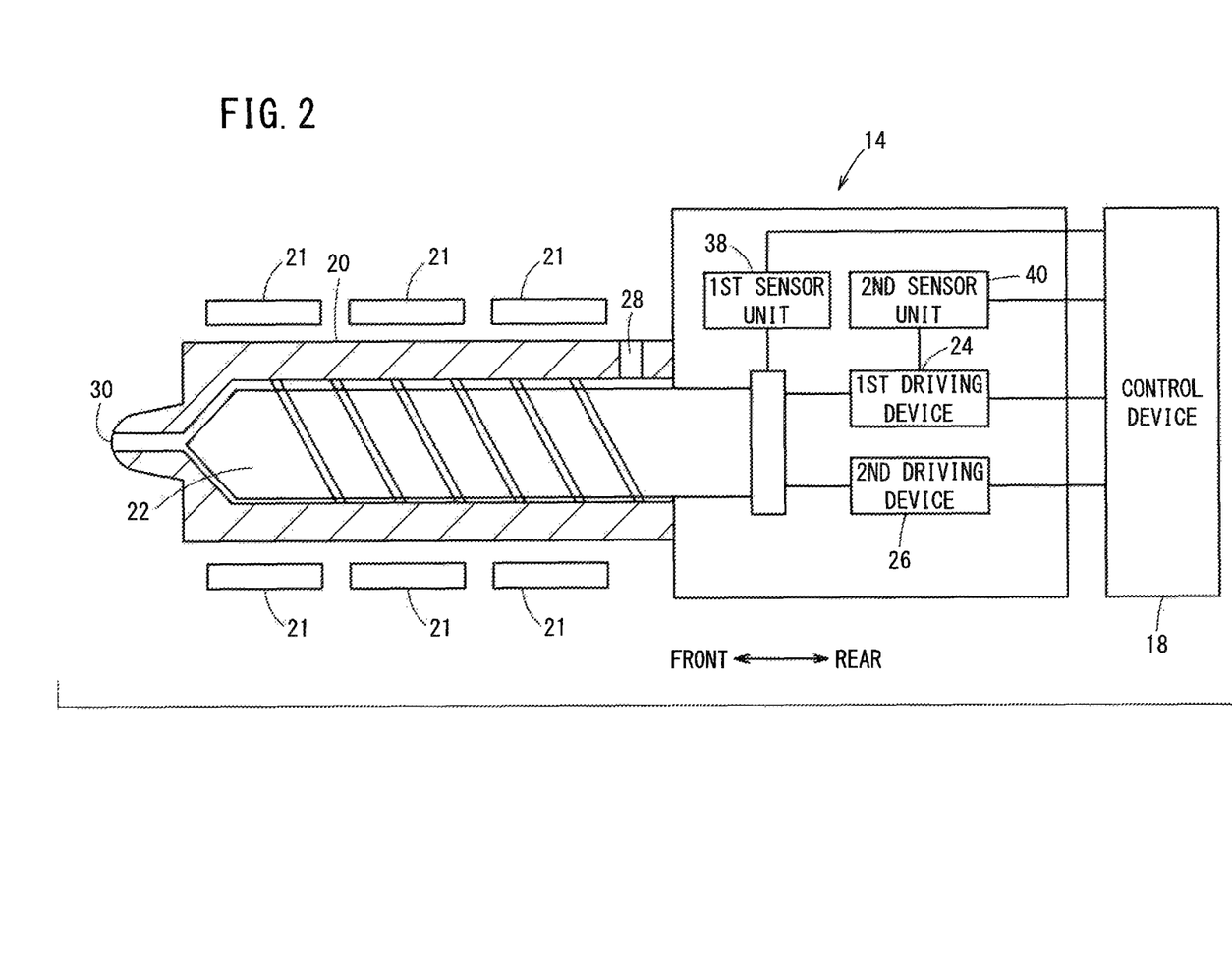
FIG. 2 is a partial schematic configuration diagram showing the injection molding machine according to the embodiment.

FIG. 2 is a partial schematic configuration diagram showing the injection molding machine 10 according to the embodiment.

The injection unit 14 includes a heating cylinder 20, heaters 21 arranged on the outer side of the heating cylinder 20, a screw 22 arranged inside the heating cylinder 20, a first driving device 24 and a second driving device 26 connected to the screw 22. The configuration of the injection unit 14 will be described below.

The heating cylinder 20 has a supply port 28 arranged on the rearward side in order to supply resin before melting into the heating cylinder 20, and a nozzle 30 that is arranged at the distal end on the forward side and is connected to the mold when the resin melted in the heating cylinder 20 is injected.

The screw 22 rotates in a forward direction and in a reverse direction in the heating cylinder 20 according to the feeding operation of the first driving device 24. Further, the screw 22 moves forward and backward inside the heating cylinder 20 in the front-rear direction according to the feeding operation of the second driving device 26. Here, the first driving device 24 and the second driving device 26 are devices that are constructed of a combination of motors, hydraulic pumps, gears, belts and pulleys, ball screws and the like.

The screw 22 is formed with a helical groove. As the screw 22 is rotated in the forward direction, a forward rotation torque of the screw 22 is applied to the resin supplied from the supply port 28 into the heating cylinder 20. As a result, the resin in the heating cylinder 20 is heated by the heaters 21 and is pressurized and fed (conveyed) forward in the heating cylinder 20 along the helical groove of the screw 22 by the forward rotation of the screw 22. In this process of pressurization and conveyance, the resin is melted (plasticized). As this process proceeds, the screw 22 moves backward. As a result, a predetermined amount of the melted resin (molten resin) is accumulated on the front side of the heating cylinder 20 while being pressurized with a predetermined pressure (which is called metering or measuring).

At the front end of the screw 22, there is arranged a check ring (for backflow prevention parts, not shown) that opens or closes the resin flow path in the heating cylinder 20 in accordance with the operation of the screw 22 to be described later. The check ring receives pressure from the resin that is pressurized and fed from the rear to the front in the heating cylinder 20 and then opens the flow path. Further, when the resin is injected, the check ring receives pressure from the resin accumulated on the front side of the ring and then closes the flow path. This prevents excessive backflow of the accumulated resin.

Figure 3:
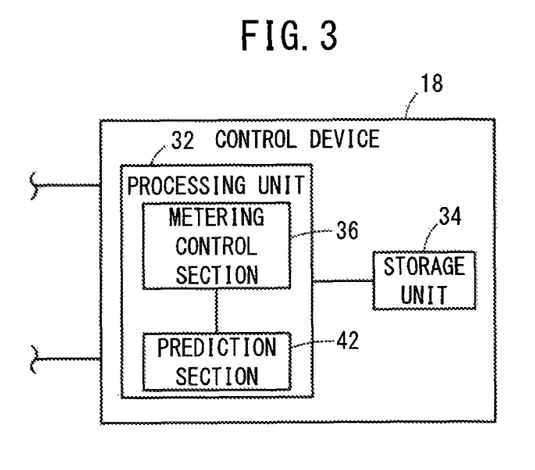
FIG. 3 is a schematic configuration diagram showing a control device according to the embodiment.

FIG. 3 is a schematic configuration diagram of the control device 18 according to the embodiment.

As described above, the injection unit 14 is controlled by the control device 18. The control device 18 includes a processing unit 32 and a storage unit 34. The processing unit 32 is, for example, a processor, and the storage unit 34 is, for example, a memory. The control device 18 of the present embodiment controls the injection unit 14 by causing the processing unit 32 to run a predetermined program stored in the storage unit 34.

The processing unit 32 includes a metering control section 36 that controls the first driving device 24 and the second driving device 26. The metering control section 36 controls the first driving device 24 and the second driving device 26 so that the screw 22 is moved backward to a predetermined position (metering position) while rotating forward, to thereby meter the required amount of resin for molding. Since the position of the screw 22 in the front-rear direction inside the heating cylinder 20 can be measured based on a known technique, so the description thereof is omitted in the present embodiment.

Further, the metering control section 36 controls the first driving device 24 to rotate the screw 22 in reverse after the metering of the resin. This reverse rotation of the screw 22 lowers the pressure in the forward direction for compressing and feeding the resin toward the nozzle 30. Thus, the reverse rotation of the screw 22 prevents unintended leakage (drooling) of the resin from the nozzle 30. In the present embodiment, the operation process of, after the metering, adjusting the pressure of the resin in a manner so as to reduce the pressure in this way is also generically referred to as the "decompressing process".

In the decompressing process, the resin after metering can also be depressurized by moving the screw 22 backward to a predetermined position, instead of rotating the screw 22 in reverse. The injection molding machine 10 may perform reverse rotation and backward movement (retracting) of the screw 22 in an appropriate combination, or may perform them individually. For easy understanding in the description of the embodiment, it is assumed that backward movement of the screw 22 is not performed during the reverse rotation.

Here, if the amount of pressure reduction or the degree of decompression (rate of reduction in pressure and reverse rotation time) by the decompressing process is excessive, air is drawn from the nozzle 30 into the heating cylinder 20, resulting in air bubbles occurring in the resin. The injection molding machine 10 performs molding by decompressing the measured resin and thereafter injecting the resin from the nozzle 30 into the mold of the clamping unit 12. If air bubbles are generated in the resin, this causes quality defects. Therefore, it is ideal that the decompressing process should be executed so as to prevent generation of air bubbles in the resin while preventing the drooling.

In order to execute the above ideal decompressing process, the injection molding machine 10 of the present embodiment further includes a first sensor unit 38 and a second sensor unit 40 (FIG. 2). Further, the processing unit 32 of the control device 18 further includes a prediction section 42 (FIG. 3). Hereinafter, description will be made in order.

The first sensor unit 38 has a pressure sensor element and is connected to the screw 22. In the present embodiment, as shown in FIG. 2, the first sensor unit 38 is connected to the rear end portion of the screw 22. The first sensor unit 38 is also connected to the control device 18. Thus, the first sensor unit 38 can sequentially detect the pressure of the resin applied to the screw 22 and output the detection value to the control device 18.

The second sensor unit 40 has a current sensor element and is connected to the first driving device 24 and the control device 18. With this configuration, the second sensor unit 40 can sequentially detect electric current flowing through the first driving device 24 and output the current value to the control device 18. The "current value of the first driving device 24" is not particularly limited, but refers to the "the value of electric current flowing through the motor of the first driving device 24" in the present embodiment.

The first sensor unit 38 and the second sensor unit 40 sequentially output the pressure and the current value of the first driving device 24 detected during a predetermined period (detection period), to the prediction section 42 of the control device 18. In this embodiment, the "detection period" is specified as the duration from when the distance by which the screw 22 is moved backward during metering becomes equal to or more than half the distance between the backward movement start point and the metering position, to when the screw 22 reaches and stops at the metering position.

The prediction section 42 predicts decompressing rotation information, by referring to a predetermined conversion formula (function) and also based on the pressure detected by the first sensor unit 38 and the current value detected by the second sensor unit 40. The above conversion formula may be experimentally determined in advance and stored in the storage unit 34 so that the prediction section 42 can appropriately refer to it.

The above "decompressing rotation information" is information that includes the rotation angle (or rotation time) of the screw 22 by which the screw 22 should be rotated in reverse after the metering in order to reduce the pressure to a target pressure, and the rotation speed at which the screw 22 should be rotated in reverse after the metering in order to keep the amount of change of the pressure per unit time at a predetermined level or lower.

The "target pressure" of the decompression rotation information is the magnitude of the resin pressure at which the force to pressurize and feed the resin toward the nozzle 30 becomes close to zero (ideally zero). In this embodiment, the target pressure is set at zero.

The "rotation speed" of the decompressing rotation information is preferably as high as possible from the viewpoint of the time efficiency of molding performed by the injection molding machine 10. Further, the "predetermined level" for limiting the rotation speed is determined in consideration of the properties of the resin and the mechanical specifications of the injection molding machine 10, so as to fall within a range in which no entrainment of air from the nozzle 30 into the heating cylinder 20 will occur before the pressure reaches the target pressure.

In the above, it should be noted that the "range in which no entrainment of air from the nozzle 30 into the heating cylinder 20 will occur before the pressure reaches the target pressure" may change continuously due to the torque of the reverse rotation of the screw 22. The prediction section 42 may make a prediction that "the rotation speed of the screw should be changed after the screw 22 has been moved backward to a certain position", based on the time-sequential change of the pressure of the resin during the detection period and the time-sequential change of the current value of the first driving device 24 that rotates the screw 22 in reverse. Thus, the prediction section 42 can predict the decompressing rotation information so as to maintain the rotation speed of reverse rotation of the screw 22 for setting the resin pressure to the target pressure, always at the optimum (the highest speed within the allowable range).

The resin being metered is sent forward while being compressed (pressurized) along the groove of the screw 22, as described above. At this time, there occurs a forward flow in the resin. This flow is generated as a result of various factors such as the type, viscosity of resin, the temperature of the heating cylinder 20, the rotation speed and pressure of the screw 22 at the time of metering. The pressure after metering is affected by these factors and changes every moment. Therefore, it is difficult to predict the optimum rotation angle and rotation speed for the decompressing process only by detecting the pressure.

To deal with the above situation, the prediction section 42 of the embodiment takes into account not only the pressure of the resin before the start of reverse rotation, but also a physical quantity (the current value of the first driving device 24 that rotates the screw 22) that affects the change of the pressure. Thereby, the prediction section 42 predicts the optimum rotation angle and rotation speed for the decompressing process with good accuracy before implementation of a decompressing process.

As described above, in the injection molding machine 10 according to the present embodiment, based on the pressure detected by the first sensor unit 38 and the current value of the first driving device 24 detected by the second sensor unit 40, the prediction section 42 predicts optimum decompressing rotation information (rotation angle and rotation speed) when the screw 22 is rotated in reverse. As a result, the dependence of the decompressing process on the operator's skill is reduced.

The prediction section 42 outputs the predicted decompressing rotation information to the metering control section 36. Then, the metering control section 36 executes a decompressing process based on the input decompressing rotation information. At this time, the rotation speed and the rotation angle of the screw 22 during the decompressing process are controlled based on the decompressing rotation information input to the metering control section 36. Therefore, in the injection molding machine 10 of the present embodiment, no feedback control during reverse rotation of the screw 22 is needed, so that there is no control delay occurring during the decompressing process.

The physical quantities that affect the change of the pressure are not limited to the current value of the first driving device 24. For example, the second sensor unit 40 may directly or indirectly detect the rotation speed, phase and torque of the screw 22, the position of the screw 22 in the front-rear direction, the temperature of the resin, the temperature of the heating cylinder 20 (heaters 21), and/or the current value of the second driving device 26. Further, the physical quantities may include those that are detected from each of hydraulic pumps, gears, belts and pulleys, ball screws, etc. of the first driving device 24 and the second driving device 26. All of these are physical quantities that are considered to affect the change of the resin pressure. Thus, the physical quantities detected by the second sensor unit 40 may be changed as appropriate. In relation to this, the second sensor unit 40 may include temperature sensors, encoders, torque meters and the like as appropriate, and may be connected to a portion other than the first driving device 24 as necessary.

Correspondingly, conversion formula used for prediction by the prediction section 42 may be appropriately prepared. Here, the prediction section 42 may obtain and use other physical quantities other than the above by converting the aforementioned detectable physical quantities, based on the predetermined numerical values such as the mechanical specifications of the injection molding machine 10, e.g., rated values and reduction ratios, and the operation settings of the injection molding machine 10. The prediction section 42 may perform prediction based on the thus obtained converted physical quantities.

The state of the resin at the time of metering changes from moment to moment as described above. In comparison between the metering start and the metering end, it is considered that the physical quantity at the metering end is closer to the state of the resin at the time when the screw 22 is rotated in reverse.

Therefore, in the present embodiment, the duration from when the distance by which the screw 22 is moved backward during metering becomes equal to or more than half the distance between the backward start point and the metering position to when the screw 22 reaches and stops at the metering position is defined as the detection period, as mentioned above. This enables the prediction section 42 to acquire the pressure of sufficiently plasticized resin (that is, the resin in a state as close to the state at the time of rotating the screw 22 in reverse, as possible) and the physical quantity that affects the change of the pressure (e.g., the current value of the first driving device 24) before start of the reverse rotation of the screw 22. Therefore, the prediction section 42 of the embodiment can predict the decompressing rotation information with good accuracy.

However, the detection period is not limited to the above. The detection period may be the entire range during the backward movement of the screw 22 from the backward movement start point to the metering position during metering, or may be a part of the predetermined entire range. That is, the prediction section 42 may predict decompressing rotation information, based on the pressures detected by the first sensor unit 38 and one or more kinds of physical quantities detected by the second sensor unit 40 during the period from the time the screw 22 starts forward rotation to the time it starts reverse rotation.

The above is an example of the configuration of the injection molding machine 10 of the present embodiment. Hereinafter, description will be given on an example where the above injection molding machine 10 executes a metering and decompressing process.

Figure 4A:
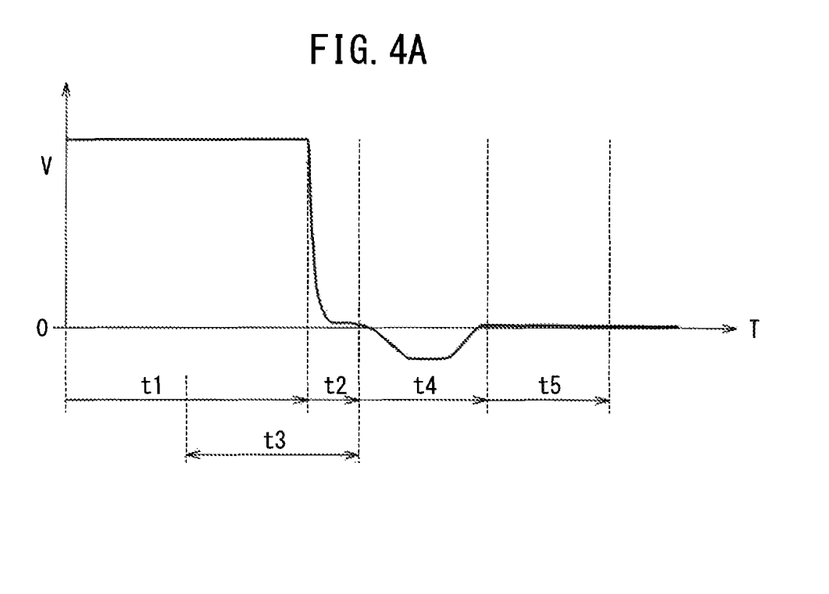
FIG. 4A is a time chart showing an example of changes in the rotation speed of the screw when the injection molding machine according to the embodiment executes a metering (measuring) process and a decompressing process.
Figure 4B:
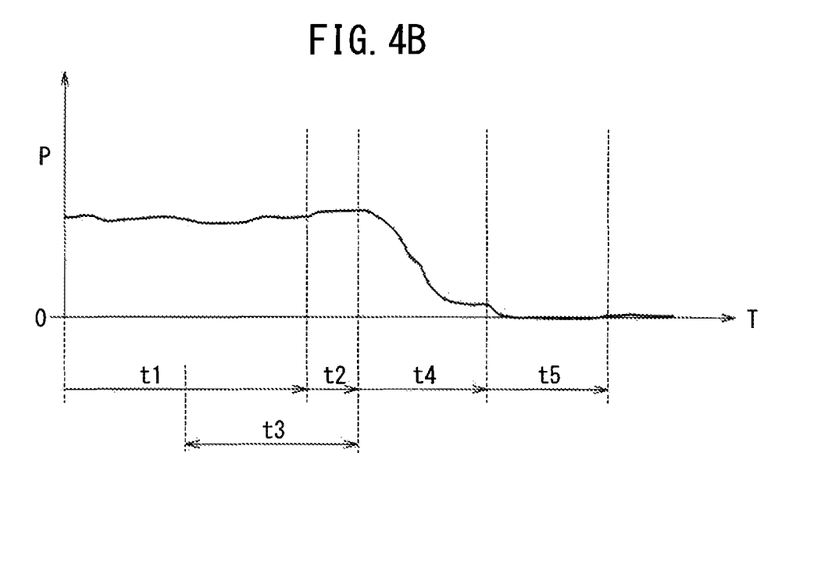
FIG. 4B is a time chart showing an example of changes in resin pressure in the same time sequence as in FIG. 4A.

FIG. 4A is a time chart showing an example of changes in the rotation speed of the screw 22 when the injection molding machine 10 according to the embodiment executes a metering and decompressing process. FIG. 4B is a time chart showing an example of changes in resin pressure in the same time sequence as FIG. 4A. In FIG. 4A, the vertical axis V represents "the rotation speed of the screw 22" and the horizontal axis T represents "time". In FIG. 4B, the vertical axis P is "the pressure of the resin in the heating cylinder 20", and the horizontal axis T is "time".

By monitoring the rotation speed of the screw 22 in the injection molding machine 10 of the embodiment, the time chart shown in FIG. 4A is obtained as an example. At the same time, by monitoring the pressure of the resin in the heating cylinder 20, the time chart of FIG. 4B is obtained as an example.

A period t1 in FIGS. 4A and 4B is a time period during which the screw 22 moves backward to the metering position while rotating forward. The forward rotation speed (V) of the screw 22 at this time is constant in the example of FIG. 4A. Further, the backward movement speed of the screw 22 at this time is successively adjusted by the metering control section 36 controlling the second driving device 26 so that the resin pressure (P) takes substantially a predetermined value as shown in FIG. 4B.

A period t2 in FIGS. 4A and 4B is a time period from when the screw 22 reaches the metering position until the forward rotation of the screw 22 stops. A period t3 in FIGS. 4A and 4B is the aforementioned "detection period". The period t3 (detection period) of the embodiment overlaps part of the period t1 and the period t2. The prediction section 42 predicts decompressing rotation information based on the resin pressure (P) and the current value of the first driving device 24, detected during the period t3.

A period t4 in FIGS. 4A and 4B is a time period during which a decompressing process is being executed based on the decompressing rotation information. In the period t4, the rotation speed (V) of the screw 22 is controlled based on the decompressing rotation information so that the amount of reduction in pressure per unit time does not exceed a predetermined amount while the screw 22 rotates in reverse by the predicted rotation angle. Further, in the period t4, the rotation angle of the screw 22 is controlled based on the decompressing rotation information such that the resin pressure (P) becomes the target pressure (zero).

A period t5 in FIGS. 4A and 4B is a time period in which the screw 22 is further moved forward and backward after reverse rotation of the screw 22. In this way, the injection molding machine 10 of the present embodiment may make further fine adjustment of the resin pressure (P) after the reverse rotation of the screw 22, by moving the screw 22 forward and backward.

As described above, according to the injection molding machine 10 of the present embodiment, decompression of the resin can be optimally effected.

[Modifications]

Though the above embodiment has been described as one example of the present invention, it goes without saying that various modifications and improvements can be added to the above embodiment. It is also apparent from the scope of claims that the embodiment added with such modifications and improvements should be incorporated in the technical scope of the invention.

(Modification 1)

In the embodiment, as explained above, there can be multiple kinds of physical quantities that affect the change of the resin pressure. The second sensor unit 40 may detect multiple kinds of physical quantities that affect the change of the pressure. In addition, the conversion formula may be changed accordingly.

For example, the second sensor unit 40 may detect the current value of the first driving device 24 and the current value of the second driving device 26, separately. In this case, the prediction section 42 may predict decompressing rotation information based on the pressure detected by the first sensor unit 38 and these two kinds of current values. In this way, by increasing the information based on which the decompressing rotation information is predicted, it is possible to improve prediction accuracy of the prediction section 42.

In this case, the second sensor unit 40 may be configured as a sensor element group including multiple sensor elements whose detection targets are different from each other. The sensor element group does not necessarily have to be integrally configured, and each of the multiple sensor elements may be arranged as appropriate at a necessary location for detecting the target to be detected.

(Modification 2)

The contents of the decompressing rotation information may be appropriately changed as necessary. For example, in the above description of the embodiment, the decompressing rotation information includes both the rotation angle and the rotation speed of the screw 22 at the time of reverse rotation. However, the prediction section 42 may predict only one of the rotation angle and the rotation speed as the decompressing rotation information. In that case, the metering control section 36 may execute a decompressing process while fixing the remaining one of the rotation angle and the rotation speed at a predetermined set value.

When the prediction section 42 predicts only the rotation angle as the decompressing rotation information, instead of both the rotation angle and the rotation speed, it is possible to optimize at least the total amount of reduction in pressure at the decompressing process. On the other hand, when the prediction section 42 predicts only the rotation speed as the decompressing rotation information, instead of both the rotation angle and the rotation speed, it is possible to optimize at least the amount of reduction in pressure per unit time, within the range of the predetermined rotation angle.

(Modification 3)

After moving the screw 22 backward while rotating the screw 22 forward, the metering control section 36 may rotate the screw 22 in reverse for a predetermined time, based on provisional rotation information including at least one of a predetermined rotation speed and a predetermined rotation angle. In this case, the metering control section 36 may rotate the screw 22 in reverse for the predetermined time and thereafter rotate the screw 22 in reverse based on the decompressing rotation information predicted by the prediction section 42.

Here, the "predetermined rotation speed", the "predetermined rotation angle", and the "predetermined time" are values that may be preset as fixed values in the metering control section 36.

In addition, the prediction section 42 may predict decompressing rotation based on the pressure and one or more kinds of physical quantities detected by the first sensor unit 38 and the second sensor unit 40, during the inverse rotation of the screw 22 based on the provisional rotation information.

This enables the prediction section 42 to predict decompressing rotation based on the pressure, and the physical quantities that influence the change of the pressure, detected when the screw 22 is actually rotating in reverse though under the conditions determined by the fixed values. Therefore, according to this modification, it is possible to improve accuracy of the prediction performed by the prediction section 42.

In the above description, implementation of reverse rotation for a predetermined time is set as a transition condition for transitioning into the reverse rotation of the screw 22 based on the decompressing rotation information, but the present modification is not limited to this.

As an example of application of this modification, for example, the metering control section 36 may be configured to start (transition into) the reverse rotation of the screw 22 based on the decompressing rotation information on the condition that the screw 22 has rotated in reverse by an infinitesimal predetermined rotation angle. In this case, the prediction section 42 may predict decompressing rotation information based on the pressure, and the physical quantities that affect the change of the pressure, detected until the screw 22 rotates by a predetermined rotation angle.

Further, as another example of the present modification, the metering control section 36 may successively acquire the pressure from the first sensor unit 38, and start (transition into) the reverse rotation of the screw 22 based on the decompressing rotation information, on the condition that the resin pressure has lowered to a predetermined level. In this case, the prediction section 42 may predict decompressing rotation information based on the pressure, and the physical quantities that affect the change of the pressure, detected until the resin pressure decreases to the predetermined level.

(Modification 4)

Figure 5:
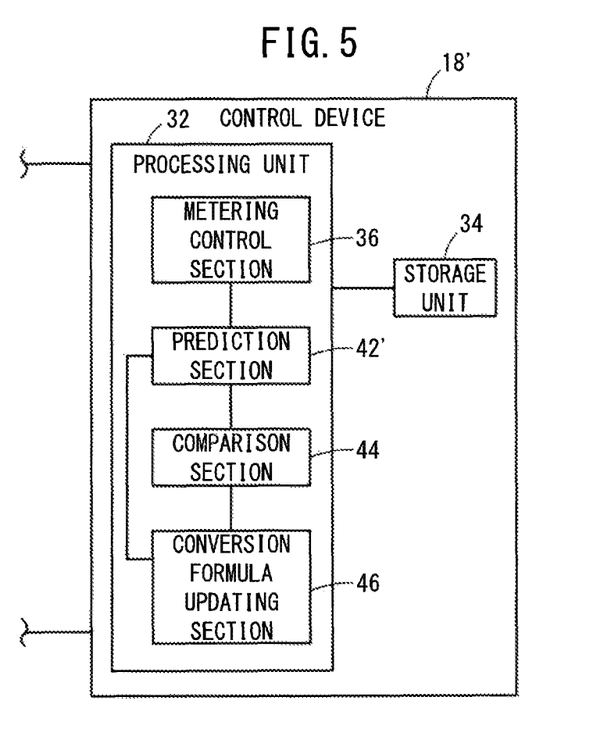
FIG. 5 is a schematic configuration diagram showing a control device of a modification 4.

FIG. 5 is a schematic configuration diagram showing a control device 18' of a modification 4.

The injection molding machine 10 may further include a comparison section 44 that compares the change of the pressure predicted based on decompressing rotation information with the actual change of the pressure when the screw 22 is rotated in reverse based on the decompressing rotation information. In that case, the injection molding machine 10 may further include a conversion formula updating section 46 that updates the conversion formula so as to minimize the deviation between the predicted change of the pressure and the actual change of the pressure, based on the comparison from the comparison section 44. The comparison section 44 and the conversion formula updating section 46 are provided in the control device 18', as shown in FIG. 5, for example.

The prediction section 42 in the present modification (hereinafter, also referred to as "prediction section 42'" for distinction) outputs predicted decompressing rotation information to the comparison section 44. Thereby, the comparison section 44 can predict the change of the pressure based on the decompressing rotation information. Further, in this modification, the first sensor unit 38 successively detects the resin pressure and outputs it to the comparison section 44 while the screw 22 is being rotated in reverse based on the decompressing rotation information. As a result, the comparison section 44 can grasp the actual change of the pressure while the screw 22 is being rotated in reverse based on the decompressing rotation information.

The comparison section 44 calculates the deviation between the predicted change of the pressure and the actual change of the pressure, for example, based on statistical information analysis. Further, the comparison section 44 outputs the obtained deviation to the conversion formula updating section 46.

The conversion formula updating section 46 updates the conversion formula so that the deviation between the predicted change of the pressure and the actual change of the pressure is minimized by using, for example, a cost function. At this time, the conversion formula updating section 46 may appropriately acquire information, including the decompressing rotation information, necessary to minimize the deviation by using the cost function, from the prediction section 42', the first sensor unit 38, the second sensor unit 40, and the comparison section 44. The conversion formula may be updated by using, as the necessary information, preset values including mechanical specifications and operation settings of the injection molding machine 10, such as rated values, reduction ratios, screw diameters, and the like. The conversion formula updating section 46 stores the updated conversion formula in the storage unit 34.

In the subsequent decompressing process, the prediction section 42' predicts decompressing rotation information using the updated conversion formula. As a result, the prediction section 42' can predict decompressing rotation information with a smaller deviation from the actual change of the pressure.

As described above, according to this modification, the accuracy of the prediction of the prediction section 42' is improved every time the injection molding machine 10 performs a decompressing process, so that the next decompressing process onward can be performed more optimally. The comparison section 44 and the conversion formula updating section 46 may be configured as a part of the prediction section 42'.

(Modification 5)

The prediction section 42 does not necessarily have to perform prediction of decompressing rotation information each time metering is performed. For example, when resin metering, decompression and injection are continuously performed as a series of molding cycles, the second and subsequent molding cycles may be performed based on the decompressing rotation information predicted at the time of metering in the first molding cycle.

This makes it possible to suppress increase in the processing load on the injection molding machine 10 when molded articles are mass-produced by repeatedly performing molding cycles under the same conditions.

(Modification 6)

In the embodiment, the inline type injection molding machine 10 has been described. Application of the first sensor unit 38, the second sensor unit 40 and the prediction section 42 is not limited to the in-line type injection molding machine 10. The configuration of the present embodiment can be applied also to a so-called pre-plasticizing type injection molding machine as long as metering and pressure control of the resin are performed, whereby it is possible to realize optimal metering and pressure control. The same applies to each of the modifications described above. For example, the comparison section 44 and the conversion formula updating section 46 of Modification 4 may be applied to a pre-plasticizing injection molding machine.

(Modification 7)

The above-described embodiment and modifications may be appropriately combined as long as no contradiction occurs.

Inventions Obtained from the Embodiment

The inventions that can be grasped from the above embodiment and modifications will be described below.

The injection molding machine (10) including a heating cylinder (20) configured to melt resin and a screw (22) provided inside the heating cylinder (20) includes: a first driving device (24) configured to rotate the screw (22) inside the heating cylinder (20); a second driving device (26) configured to move the screw (22) forward and backward inside the heating cylinder (20); a metering control section (36) configured to, by controlling the first driving device (24) and the second driving device (26), move the screw backward while rotating the screw (22) forward so as to meter an amount of the resin while melting the resin, and thereafter rotate the screw (22) in reverse to thereby reduce the pressure of the resin; a first sensor unit (38) configured to detect the pressure; a second sensor unit (40) configured to detect one or more kinds of physical quantities that affect the change of the pressure, from the injection molding machine (10); and a prediction section (42, 42') configured to predict decompressing rotation information including at least one of the rotation angle by which the screw (22) should be rotated in reverse after the metering in order to reduce the pressure to a target pressure and the rotation speed at which the screw (22) should be rotated in reverse after the metering in order to keep the amount of change of the pressure per unit time at a predetermined level or lower, based on the pressure detected by the first sensor unit (38) and the one or more kinds of physical quantities detected by the second sensor unit (40). The metering control section (36) is configured to control the first driving device (24) based on the decompressing rotation information predicted by the prediction section (42, 42').

Thus, it is possible to provide the injection molding machine (10) capable of performing optimal decompression of the molten resin.

The second sensor unit (40) may be configured to detect at least one of the rotation speed of the screw (22), the torque of the screw (22), the temperature of the resin, the electric current values of the first driving device (24) and the second driving device (26), the position of the screw (22), the phase of rotation of the screw (22). This configuration enables the prediction section (42, 42') to detect the decompressing rotation information, which would otherwise be difficult to predict based only on the detection of the pressure of the resin before the start of reverse rotation. Further, since the second sensor unit (40) detects multiple physical quantities, it is possible to improve prediction accuracy of the prediction made by the prediction section (42, 42').

The prediction section (42, 42') may be configured to predict the decompressing rotation information based on the pressure and the one or more kinds of physical quantities detected by the first sensor unit (38) and the second sensor unit (40) during a period from when the screw (22) starts rotating forward to when the screw starts rotating in reverse. This configuration enables the prediction section (42, 42') to predict the decompressing rotation information before the start of reverse rotation of the screw (22).

The metering control section (36) may be configured to move the screw (22) backward to a predetermined metering position while rotating the screw (22) forward, and the prediction section (42, 42') may be configured to predict the decompressing rotation information based on the pressure and the one or more kinds of physical quantities detected by the first sensor unit (38) and the second sensor unit (40) after the distance by which the screw (22) has moved backward becomes equal to or more than half the distance between the backward movement start point and the metering position. This makes it possible to acquire the pressure of the resin in a state as close to that when the screw (22) rotates in reverse, as possible, and the current value of the first driving device (24) in such a state, before the start of reverse rotation of the screw (22).

The metering control section (36) may be configured to rotate the screw (22) in reverse for a predetermined time based on provisional rotation information including at least one of a predetermined rotation speed and a predetermined rotation angle, after having moved the screw (22) backward while rotating the screw (22) forward, and thereafter rotate the screw (22) in reverse based on the decompressing rotation information predicted by the prediction section (42, 42'), and the prediction section (42, 42') may be configured to predict the decompressing rotation information based on the pressure and the one or more kinds of physical quantities detected by the first sensor unit (38) and the second sensor unit (40) while the screw (22) is rotating in reverse based on the provisional rotation information. This configuration makes it possible to predict the decompressing rotation information, based on the pressure, and the physical quantities that affect the change of the pressure, which are detected when the screw (22) is being actually rotated in reverse.

The prediction section (42') may be configured to predict the decompressing rotation information from the pressure detected by the first sensor unit (38) and the one or more kinds of physical quantities detected by the second sensor unit (40), on the basis of a predetermined conversion formula, and the first sensor unit (38) may be configured to successively detect the pressure while the screw (22) is rotating in reverse based on the decompressing rotation information. The injection molding machine (10) may further include: a comparison section (44) configured to compare the change of the pressure predicted based on the decompressing rotation information with the actual change of the pressure when the screw (22) is rotated in reverse based on the decompressing rotation information; and a conversion formula updating section (46) configured to update the conversion formula so as to minimize the deviation between the predicted change of the pressure and the actual change of the pressure, based on the comparison made by the comparison section (44). With this configuration, every time a decompressing process of melted resin is performed, the injection molding machine (10) becomes able to optimize the next and subsequent decompression of the molten resin.

What is claimed is:

1. An injection molding machine including a heating cylinder configured to melt resin and a screw provided inside the heating cylinder, comprising:
    a first driving device configured to rotate the screw inside the heating cylinder;
    a second driving device configured to move the screw forward and backward inside the heating cylinder;
    a metering control section configured to, by controlling the first driving device and the second driving device, move the screw backward while rotating the screw forward so as to meter an amount of the resin while melting the resin, and thereafter rotate the screw in reverse to thereby reduce a pressure of the resin;
    a first sensor unit configured to detect the pressure;
    a second sensor unit configured to detect one or more kinds of physical quantities that affect change of the pressure, from the injection molding machine; and
    a prediction section configured to predict decompressing rotation information including at least one of a rotation angle by which the screw should be rotated in reverse after the metering in order to reduce the pressure to a target pressure or a rotation speed at which the screw should be rotated in reverse after the metering in order to keep an amount of change of the pressure per unit time at a predetermined level or lower, based on the pressure detected by the first sensor unit and the one or more kinds of physical quantities detected by the second sensor unit before the screw is rotated in reverse,
    wherein the metering control section is configured to control the first driving device based on the decompressing rotation information predicted by the prediction section.

2. The injection molding machine according to claim 1, wherein the second sensor unit is configured to detect at least one of a rotation speed of the screw, a torque of the screw, a temperature of the resin, electric current values of the first driving device and the second driving device, a position of the screw, a phase of rotation of the screw.

3. The injection molding machine according to claim 2, wherein, after moving the screw backward while rotating the screw forward, the metering control section rotates the screw in reverse for a predetermined time, based on provisional rotation information including at least one of a predetermined rotation speed and a predetermined rotation angle.

4. The injection molding machine according to claim 1, wherein the prediction section is configured to predict the decompressing rotation information based on the pressure and the one or more kinds of physical quantities detected by the first sensor unit and the second sensor unit during a period from when the screw starts rotating forward to when the screw starts rotating in reverse.

5. The injection molding machine according to claim 4, wherein:
    the metering control section is configured to move the screw backward to a predetermined metering position while rotating the screw forward; and
    the prediction section is configured to predict the decompressing rotation information based on the pressure and the one or more kinds of physical quantities detected by the first sensor unit and the second sensor unit after a distance by which the screw has moved backward becomes equal to or more than half a distance between a backward movement start point and the metering position.

6. The injection molding machine according to claim 1, wherein:
    the metering control section is configured to rotate the screw in reverse for a predetermined time, based on provisional rotation information including at least one of a predetermined rotation speed and a predetermined rotation angle, after having moved the screw backward while rotating the screw forward, and thereafter rotate the screw in reverse based on the decompressing rotation information predicted by the prediction section; and
    the prediction section is configured to predict the decompressing rotation information based on the pressure and the one or more kinds of physical quantities detected by the first sensor unit and the second sensor unit while the screw is rotating in reverse based on the provisional rotation information.

7. The injection molding machine according to claim 1, wherein:
    the prediction section is configured to predict the decompressing rotation information from the pressure detected by the first sensor unit and the one or more kinds of physical quantities detected by the second sensor unit, based on a predetermined conversion formula;
    the first sensor unit is configured to successively detect the pressure while the screw is rotating in reverse based on the decompressing rotation information;
    the injection molding machine further includes:
    a comparison section configured to compare change of the pressure predicted based on the decompressing rotation information with actual change of the pressure when the screw is rotated in reverse based on the decompressing rotation information; and
    a conversion formula updating section configured to update the conversion formula so as to minimize a deviation between the predicted change of the pressure and the actual change of the pressure, based on comparison made by the comparison section.

8. The injection molding machine according to claim 1, further comprising a check ring that opens or closes a resin flow path in the heating cylinder in accordance with the controlling of the screw.

9. The injection molding machine according to claim 8, wherein, when the resin is injected, the check ring receives pressure from the resin accumulated on a front side of the ring and then closes the resin flow path, thereby preventing backflow of accumulated resin.

10. The injection molding machine according to claim 1, wherein the first sensor unit is attached to a rear end portion of the screw, and
wherein the second sensor unit is attached to the first driving device.

11. The injection molding machine according to claim 1, wherein the first sensor unit and the second sensor unit sequentially output the pressure and a current value of the first driving device detected during a detection period to the prediction section, and
wherein the duration period is measured from when a distance by which the screw is moved backward during the metering becomes equal to or more than half a distance between a backward movement start point and the metering position, to when the screw reaches and stops at the metering position.

12. The injection molding machine according to claim 11, wherein the prediction section predicts the decompressing rotation information, by referring to a predetermined conversion function and also based on the pressure detected by the first sensor unit and the current value detected by the second sensor unit.

13. The injection molding machine according to claim 11, wherein the prediction section makes a prediction that the rotation speed of the screw should be changed after the screw has been moved backward to a certain position based on a time-sequential change of the pressure of the resin during the detection period and a time-sequential change of the current value of the first driving device that rotates the screw in reverse.

14. The injection molding machine according to claim 1, wherein the prediction section predicts an optimum rotation angle and a rotation speed for the decompressing process before implementation of the decompressing process by taking into account both of the pressure and the one or more kinds of physical quantities.

15. The injection molding machine according to claim 1, wherein the decompressing rotation information is predicted by the prediction section prior to the screw being rotated in reverse.

16. The injection molding machine according to claim 1, wherein the prediction section predicts only one of the rotation angle and the rotation speed as the decompressing rotation information, and
wherein, the metering control section executes the decompressing process while fixing the remaining one of the rotation angle and the rotation speed at a predetermined set value.

17. The injection molding machine according to claim 1, wherein the reverse rotation of the screw and backward movement of the screw are controlled in combination.

18. An injection molding machine including a heating cylinder configured to melt resin and a screw provided inside the heating cylinder, comprising:
a first driving device configured to rotate the screw inside the heating cylinder;
a second driving device configured to move the screw forward and backward inside the heating cylinder;
a metering control section configured to, by controlling the first driving device and the second driving device, move the screw backward while rotating the screw forward so as to meter an amount of the resin while melting the resin, and thereafter rotate the screw in reverse to thereby reduce a pressure of the resin;
a first sensor unit configured to detect the pressure;
a second sensor unit configured to detect one or more kinds of physical quantities that affect change of the pressure, from the injection molding machine; and
a prediction section configured to predict decompressing rotation information including at least one of a rotation angle by which the screw should be rotated in reverse after the metering in order to reduce the pressure to a target pressure and a rotation speed at which the screw should be rotated in reverse after the metering in order to keep an amount of change of the pressure per unit time at a predetermined level or lower, based on the pressure detected by the first sensor unit and the one or more kinds of physical quantities detected by the second sensor unit,
wherein the metering control section is configured to control the first driving device based on the decompressing rotation information predicted by the prediction section,
further comprising a check ring that opens or closes a resin flow path in the heating cylinder in accordance with the controlling of the screw,
wherein the check ring receives pressure from the resin that is pressurized and fed from a rear to a front in the heating cylinder and then opens the resin flow path.

19. An injection molding machine including a heating cylinder configured to melt resin and a screw provided inside the heating cylinder, comprising:
a first driving device configured to rotate the screw inside the heating cylinder;
a second driving device configured to move the screw forward and backward inside the heating cylinder;
a metering control section configured to, by controlling the first driving device and the second driving device, move the screw backward while rotating the screw forward so as to meter an amount of the resin while melting the resin, and thereafter rotate the screw in reverse to thereby reduce a pressure of the resin;
a first sensor unit configured to detect the pressure;
a second sensor unit configured to detect one or more kinds of physical quantities that affect change of the pressure, from the injection molding machine; and
a prediction section configured to predict decompressing rotation information including at least one of a rotation angle by which the screw should be rotated in reverse after the metering in order to reduce the pressure to a target pressure and a rotation speed at which the screw should be rotated in reverse after the metering in order to keep an amount of change of the pressure per unit time at a predetermined level or lower, based on the pressure detected by the first sensor unit and the one or more kinds of physical quantities detected by the second sensor unit,
wherein the metering control section is configured to control the first driving device based on the decompressing rotation information predicted by the prediction section,
further comprising a check ring that opens or closes a resin flow path in the heating cylinder in accordance with the controlling of the screw, wherein, when the resin is injected, the check ring receives pressure from the resin accumulated on a front side of the ring and then closes the resin flow path.

* * * * *